R. H. HASSLER.
SHOCK ABSORBING DEVICE FOR VEHICLES.
APPLICATION FILED JUNE 17, 1921.
1,424,902.
Patented Aug. 8, 1922.
2 SHEETS—SHEET 1.
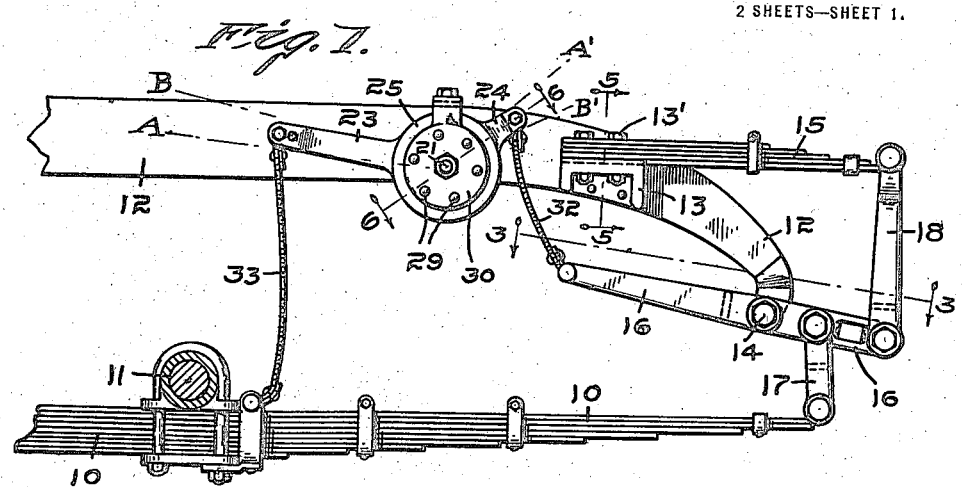
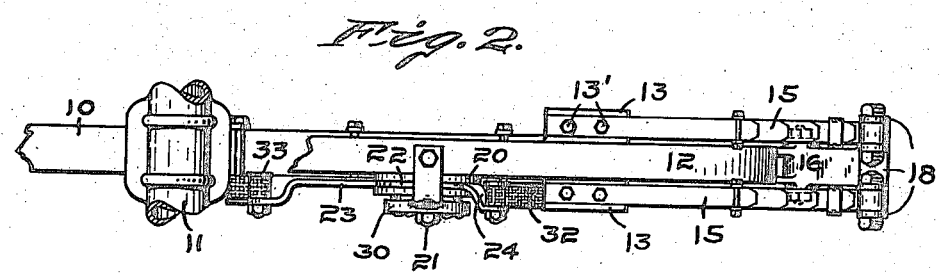
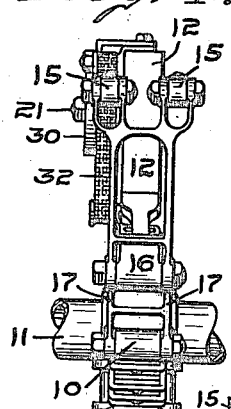
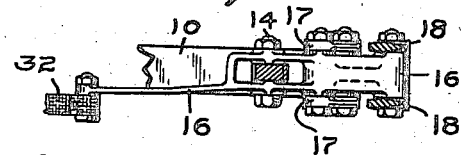
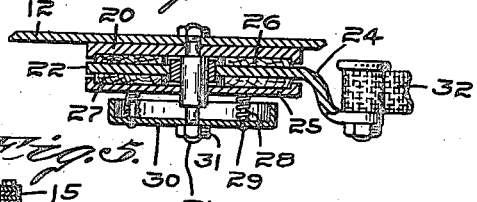
INVENTOR:
Robert H. Hassler,
By Frank W. Wormer
ATTORNEY.

R. H. HASSLER.
SHOCK ABSORBING DEVICE FOR VEHICLES.
APPLICATION FILED JUNE 17, 1921.
1,424,902.
Patented Aug. 8, 1922.
2 SHEETS—SHEET 2.
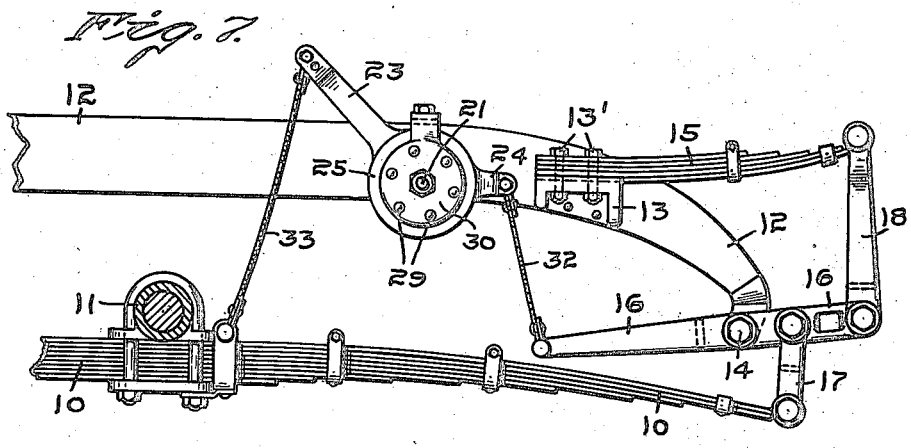
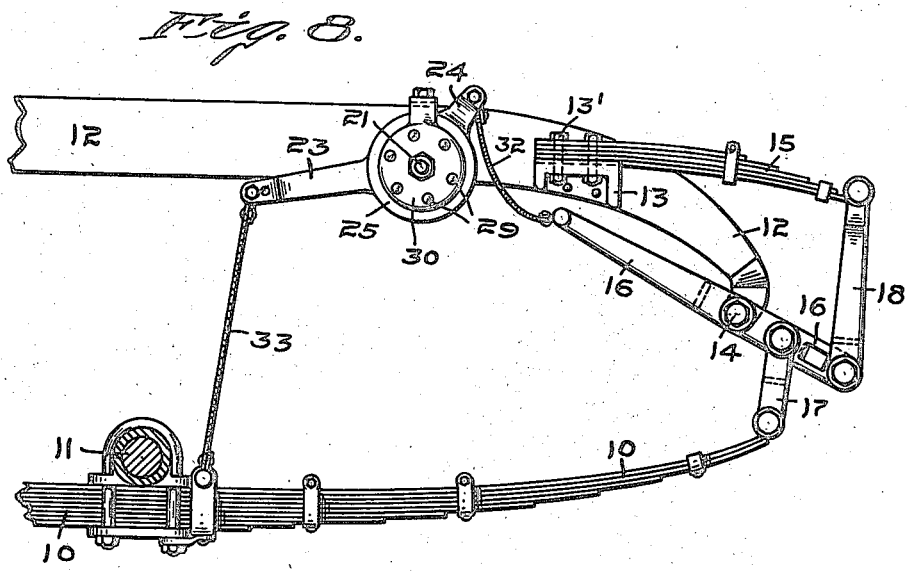
INVENTOR:
Robert H. Hassler,
ATTORNEY.

UNITED STATES PATENT OFFICE.

ROBERT H. HASSLER, OF INDIANAPOLIS, INDIANA.

SHOCK-ABSORBING DEVICE FOR VEHICLES.

1,424,902.   Specification of Letters Patent.   Patented Aug. 8, 1922.

Application filed June 17, 1921. Serial No. 478,239.

*To all whom it may concern:*

Be it known that I, ROBERT H. HASSLER, a citizen of the United States, residing at Indianapolis, in the county of Marion and State of Indiana, have invented certain new and useful Improvements in Shock-Absorbing Devices for Vehicles, of which the following is a specification.

This invention relates to a system of vehicle springs and shock absorbers—being a specific form of the invention more broadly claimed in my pending application filed May 16, 1921, Serial No. 470,121—which coact with one another to produce conditions of easy-riding under all circumstances of road travel and under variable conditions of vehicle-loading.

It is well understood by automobile engineers that stiff damping forces are needed on vehicle springs when road conditions impose violent oscillations of long period or of relatively slow movement, and that such damping forces are very objectionable when the road conditions set up small oscillations of short rapid character.

The principal object of my present invention is to provide a shock absorber of a retarding or damping type, which will act very effectually on the vehicle springs at times when such action is most needed, and which will be inactive at times when damping action is not absolutely necessary or desired.

I accomplish the above objects of the invention, and such others as may appear from a perusal of the following description, by means of one of my preferred embodiments, illustrated in the accompanying drawings, forming a part hereof, in which—

Figure 1 is a side elevation showing the various parts of one form of my invention under normal load. Fig. 2 is a top or plan view of the construction shown in Fig. 1. Fig. 3 is a fragmentary detail horizontal view, partly in plan and partly in section, on the plane 3—3 in Fig. 1. Fig. 4 is an end elevation of the construction shown in Fig. 1. Fig. 5 is a fragmentary detail transverse sectional view on the plane 5—5 in Fig 1. Fig. 6 is a fragmentary detail cross sectional view, on an enlarged scale, of the damping device, on the plane 6—6 in Fig. 1. Fig. 7 is a view similar to Fig. 1 except that the parts are shown in extreme position of compression. Fig. 8 is a view similar to Fig. 7, except that the parts are shown in extreme position of rebound.

Referring to the drawings, 10 is the main or leaf spring which is secured intermediate its length to the vehicle axle 11. 12 is a vehicle member which forms a support for a pair of supplemental leaf springs 15. As shown in Fig. 2, these supplemental springs 15 are preferably arranged parallel with each other and with the frame member 12, and are positioned so as to place one of said springs on opposite sides of the vehicle member 12. Supplemental springs 15 are rigidly connected at their forward ends to the sides of the frame member 12 by means of suitable brackets 13 and bolts 13', and the rear ends of the supplemental springs 15 project rearwardly, and, preferably, beyond the end of frame member 12.

16 is a lever which is mounted intermediate its ends on a journal-bearing 14 arranged in the end of frame member 12. Pivoted to an intermediate portion of lever 16, between journal-bearing 14 and the rear end of said lever, are the shackles 17, and these shackles pivotally engage the adjacent eye-end of the vehicle main spring 10, whereby the main spring and lever 16 are pivotally connected together. The rear ends of the supplemental springs 15 and lever 16 are pivotally connected together by means of a swinging link 18.

To control the action of the organization under excessive recoil or rebound movements of the vehicle parts, so as to minimize the danger and disagreeable effects of such movements, I provide a checking or damping device which is preferably supported on the frame member 12. This damping device contemplates the use of a metal circular base-plate 20 which is securely bolted to frame member 12 by means of a central stud 21. Stud 21 also forms the support for a tilting-lever which forms a part of the damping device. This tilting-lever comprises a disk portion 22 having formed therewith the integral arms 23 and 24, one of which is arranged on the opposite edge of said disk, as clearly shown in the drawings. The central portion 22 of the tilting-lever is held out of direct contact with the base-plate 20 and an outer pressure plate 25 by means of the friction disks 26 and 27 which are also carried by the stud 21. Pressure is applied to cause the friction disks 26 and 27 to frictionally engage the adjacent surfaces of the disk portion 22 of the tilting-lever by means of a plurality of springs 28 which are arranged concentrically around stud 21 and bear against the outer surface of pressure plate 25. These springs are held in operative position by means of the pins 29 which are mounted in a cap 30 which slips over the end of stud 21, said cap susceptible of being moved longitudinally on stud 21 so as to increase or decrease the tension on the springs 28 by the threaded nut 31. By means of the foregoing arrangement of parts, the movements or oscillations of the tilting-lever on stud 21 are damped by the frictional engagement of the plates 26 and 27. Arm 24 of the tilting lever of the damping device is connected directly to the adjacent end of lever 16 by means of a flexible element 32, and the free end of arm 23 of said tilting-lever is connected directly to the axle assembly by means of a flexible element 33.

The load of the vehicle is carried by the frame member 12 of the car through the supplemental springs 15, the lever 16, swinging link 18, shackle 17, and main spring 10 to the axle 11.

In considering the operation of the various parts, and the peculiar advantages sought to be obtained by my invention, it is desirable to first consider the parts in the position shown in Fig. 1, referred to above as the normal load position. In this view, the parts are approximately in the position they would assume when the vehicle is being driven over smooth road surfaces. The main and supplemental springs 10 and 15 are flexed to a degree substantially as shown in Fig. 1, in which position neither the main spring 10 nor the supplemental springs 15 are abnormally flexed in either direction from the above mentioned position. The flexible straps 32 and 33 are both in a slack condition, neither transmitting any forces or pulls, while the tilting-lever and its associated friction plates 26 and 27 stand stationary and substantially inoperative. When the wheels of the vehicle strike a small obstruction or depression in the roadway, the main spring 10, lever 16 and supplemental springs 15 will move or oscillate slightly over small ranges without affecting the tilting-lever of the damping device. This is accomplished by the relaxed or slackened condition of the flexible straps 32 and 33 as above stated, so that these two straps perform the function of lost motion devices. Under these conditions, the main spring 10 and supplemental springs 15 are not damped by the damping device, but, on the contrary, said springs are left free to absorb all of the minor vibrations. This makes the car ride extremely easy over city streets or wherever the roadway presents small-sized obstacles or depressions. When, however, the vehicle strikes a large-sized obstacle or depression in the roadway, the downward lurch of the frame or body element of the vehicle is of sufficient range to move the parts into the position shown in Fig. 7, in which the main spring 10 is flattened or bowed downwardly and the supplemental springs 15 are bowed upwardly through the reactive forces operating through shackles 17, lever 16 and swinging link 18, as shown. Owing to this upward bending of the supplemental springs 15, lever 16 is tilted so that its forward end pulls downwardly with great force on flexible strap 32, thus drawing downwardly arm 24 of the damping device and moving upwardly the arm 23. This upward movement of the arm 23 not only takes practically all of the slack out of the flexible strap 33 but sets the damping device in position so that its restraining action is immediately available when the main spring 10 and vehicle frame member 12 undergo movement of rebound.

After any downward movement of the frame member 12, the natural tendency of the resilient suspension system is to recoil or rebound upwardly, giving the occupants of the vehicle a severe upthrow. The position of the various parts of my invention, at the extreme limit of this upthrow, is illustrated in Fig. 8. During this upward movement, the flexible strap 33 is drawn tight and exerts a downward pull on the arm 23 of the tilting-lever. This action on the part of the damping device retards and materially checks the upthrow movement of the vehicle frame member 12, and this checking action is in full effect and begins when the frame member 12 is near the bottom of its downward lurch, and thus immediately retards, damps, or checks the upthrow of the frame member 12 as the latter rises. During this action, the main spring 10 undergoes movement and becomes bowed upwardly and the supplemental springs are bowed downwardly to more nearly their free unloaded form. This movement or flexure of the supplemental springs 15 during the time of upthrow, moves the forward end of lever 16 upwardly as shown in Fig. 8 of the drawings. The forward end of lever 16 and the arm 24 of the tilting-lever both travel upwardly at approximately the same rate of speed, so that flexible strap 32 exerts no interference to counteract the pulling effect of the flexible strap 33.

Referring to Figs. 1, 7 and 8, it will be seen that in Fig. 1 both of the flexible straps 32 and 33 are slack and are not under tension. In Fig. 7 flexible strap 32 is drawn tight under tension while the flexible strap 33 is slack; and in Fig. 8 strap 33 is drawn tight under tension while strap 32 is slack.

While I have illustrated the parts 32 and 33 as flexible straps, it will be readily understood that any other suitable equivalents, such as chains, slotted or telescoping rods, transmitting force in one direction only, may be employed.

Fig. 1 illustrates the parts in their normal or static load position—under the normal loading of the vehicle—in which the spring or springs play somewhat on each side of this position without actuating the retarding or damping device. I am aware that previous automobile manufacturers have used retarding devices having a neutral or non-acting position. Such previous devices have always had what may be called a fixed neutral point. In the movements of body and axle members, this neutral point has always been fixed at the same relative position of the said members; and this was an objectionable feature, because the neutral point could be adjusted only for one load condition of the vehicle. If the neutral point was set or adjusted for medium vehicle loads, then at light loads the body was floating too high to secure the advantage or effect of the neutral point setting of the retarding device; while at heavy loads, the body floated too low to secure the best results of the fixed setting of the restraining mechanism.

In my present invention, I attain the new, novel and useful feature of a retarding device in which the neutral or non-acting position automatically follows and continuously adjusts itself to the loading of the vehicle body.

At light loads, the first slight oscillations of the body and consequent jerks of the two flexible straps 32 and 33 alternately on the tilting friction lever, will cause it to take a position somewhere near the dotted lines A—A' and to play in an angular range lying approximate to such line.

When the body is heavily loaded, the first few alternate pulls on the two flexible straps 32 and 33 will cause the tilting-lever to take up a position near the dotted line B—B' and to play near such angular line. Of course, at all times, the tilting-lever will depart from such positions when the axle or body elements make violent oscillations; but for all small rapid oscillations, the neutral position of the device will follow the conditions of load as approximately indicated by the two angular lines, A—A' and B—B'.

My method of obtaining this neutral effect has advantages not possessed by previously used forms, for the reason that with my arrangement, the entire retarding device is inactive at times when it is not needed, and the wear on its connections is correspondingly reduced by reason of the fact that these connections are idle a large part of the time. I refer particularly to the arms 23 and 24 and their jointed connections with the flexible straps 32 and 33, or whatever mechanism may be employed to perform a similar function. This feature of having the entire retarding device standing idle when it is not needed, adds greatly to the durability of the parts, including its connections, and correspondingly reduces the noise and rattle incident to wear and looseness of such parts.

The foregoing description is merely illustrative of the principles of my invention, and other modifications thereof may be made that will function in substantially the same manner without departing from the spirit of my invention, and I do not, therefore, desire to limit myself to the use of any specific form of the parts illustrated.

Having thus fully described my said invention, what I claim as new and desire to secure by Letters Patent, is—

1. A resilient suspension system for vehicles which comprises the combination of a vehicle frame member, a main spring, a supplemental leaf spring supported by the vehicle member, a lever supported intermediate its ends in said vehicle member, means for pivotally connecting the adjacent end of the main spring to the lever between its point of connection with the frame member and its rear end, means for connecting the free end of the supplemental spring and the rear end of the lever together, a friction device arranged on the frame member, a one-way connector for connecting the friction device and the forward end of the lever together, and a second one-way connector for connecting the friction device with the main spring.

2. A resilient suspension system for vehicles which comprises the combination of a vehicle frame member, a pair of companion supplemental leaf springs arranged to mount one of said springs on opposite sides of the frame member, a lever supported intermediate its ends in the vehicle frame member, means for connecting the rear end of the lever and the free ends of the supplemental springs, means for connecting the adjacent eye-end of the main spring to an intermediate portion of the lever, a friction device, a flexible means connecting the friction device and the free end of the lever, and a second flexible means connecting the friction device and the main spring, for yieldably restraining the movements of the vehicle frame member and main spring when said movements exceed a predetermined range of travel.

3. A resilient suspension system for vehicles which comprises the combination of a vehicle frame member, a pair of companion supplemental leaf springs arranged to place one spring on opposite sides of the frame member, a lever supported intermediate its ends in the frame member, a swinging link for connecting the rear end of the lever and the free ends of the supplemental springs, shackles for connecting the adjacent eye-end of the main spring to an intermediate portion of the lever, a friction device, a flexible strap connecting the friction device and the free end of the lever, and a second flexible strap connecting the friction device and main spring, for yieldably restraining the movements of the vehicle frame member and main spring when said movements exceed a predetermined range of travel.

In witness whereof, I have hereunto set my hand and seal at Indianapolis, Indiana, this 14th day of June, A. D. one thousand nine hundred and twenty-one.

ROBERT H. HASSLER, [L. S.]